Jan. 17, 1950

G. A. SMITH 2,494,673

FLUID METERING OR CONTROL SYSTEM

Filed Oct. 9, 1945

WITNESS:

INVENTOR
George A. Smith
BY
ATTORNEYS.

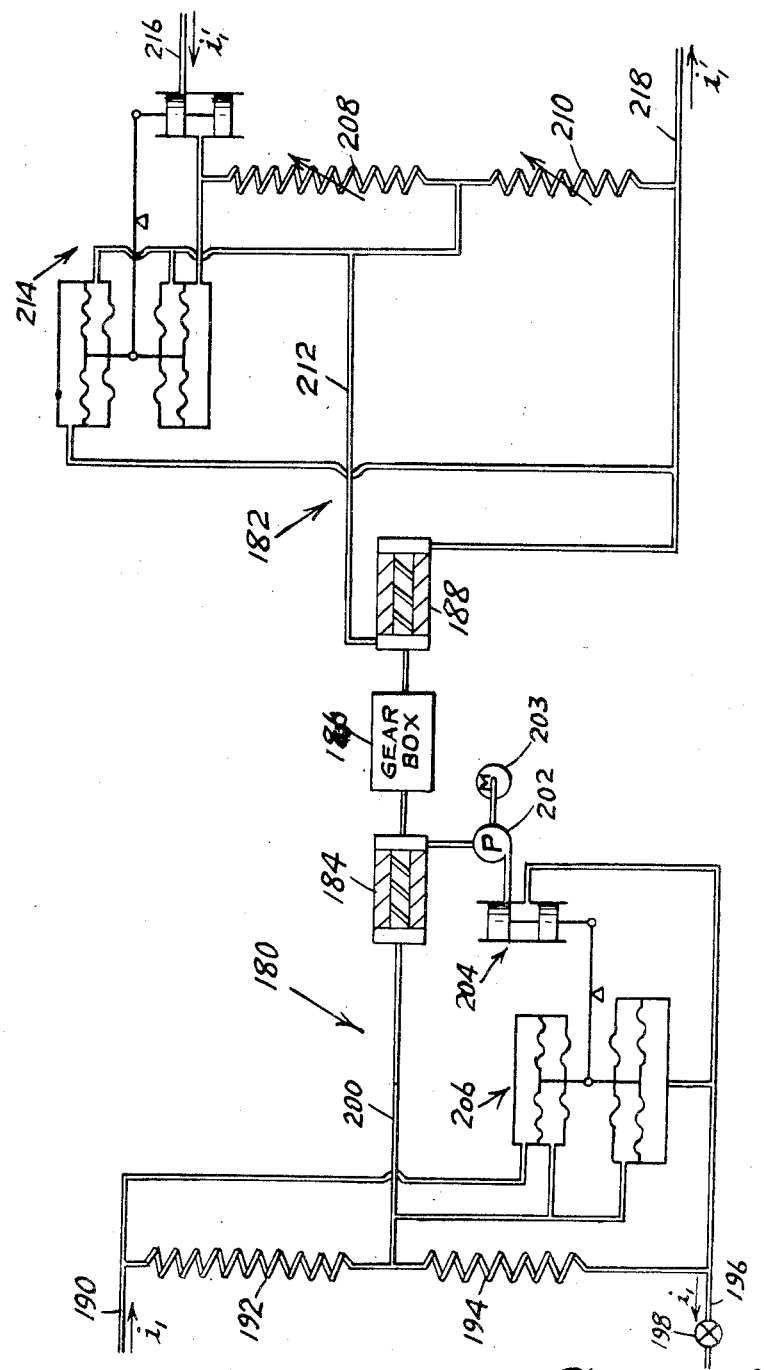

Patented Jan. 17, 1950

2,494,673

UNITED STATES PATENT OFFICE 2,494,673

FLUID METERING OR CONTROL SYSTEM

George A. Smith, Philadelphia, Pa.

Application October 9, 1945, Serial No. 621,318

13 Claims. (Cl. 73—194)

This invention relates to apparatus responsive to, or capable of controlling fluid flow, and in particular to apparatus capable of measuring, or effecting control in response to, very low fluid flow rates, or for controlling low rates of flow.

The usual types of apparatus for the measurement of fluid flow fail to give satisfactory performance below certain minimum flow rates characteristic of the apparatus. In the case of metering apparatus, such as rotameters or the like, in which a movable element responds to the flow of fluid in which it is immersed, friction, sensitivity to slight temperature changes, and other disturbing factors render the apparatus incapable of use for low flow rates. In the case of apparatus designed to measure a pressure drop across an orifice or other resistance, there must be imposed in the flow line a prohibitively high resistance in order to secure sufficient pressure drop across the resistance to be useful for measurement purposes.

The present invention has as one of its objects the provision of an apparatus responsive to very small rates of fluid flow capable of giving a very much magnified response specifically in the form of a high rate of flow of the same fluid bearing an accurate ratio relationship to the low rate of flow. The second flow thus provided may be readily measured by means of a conventional flow meter or may be caused to give rise to magnified pressure drops capable of exerting reliable controlling action.

In accordance with this phase of the invention, furthermore, there is introduced into the flow line only a low resistance despite the production of large pressure drops applicable for measurement or control purposes.

A further object of the invention is the control of low rates of fluid flow, specifically, at a rate proportional to a readily controlled higher rate of flow. In particular the invention is applicable to the production of flow rates precisely related to each other particularly when one of the rates is quite low.

These and other objects of the invention relating particularly to details of construction and operation will become apparent from the following description in which:

Figure 6 is a diagram illustrating the application of the invention to the control of a low rate of flow of one fluid by means of a low rate of flow of another.

Broadly stated, the invention contemplates the introduction into a flow line of an apparatus comprising a pair of resistances in series in the line, one of these being a high resistance and the other a low resistance. Associated with these is a fluid circulating system subject to control by pressure drops across the resistances. Despite the existence of a high resistance in series in the line the apparatus nevertheless has an effective input resistance which may be only a small fraction of the value of the high resistance, or actually negative when the apparatus produces a regulated flow.

Figure 1:
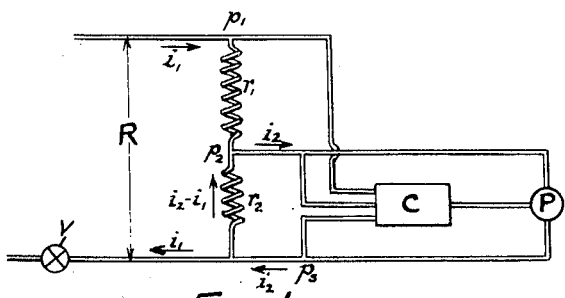
Figure 1 is a diagram illustrative of the general principles of the invention as applied to flow measurement or control by a low rate of flow.

Referring to Figure 1, assume that $r_1$ and $r_2$ are two fluid resistances arranged in series and that a flow of fluid controlled by a valve V enters and leaves the system at a flow rate $i_1$. Assuming the Hagen-Poiseuille law for flow through a smooth tube at low Reynold's numbers, i. e., (1) $$\Delta p = \frac{\rho u^2}{2D}\left(\frac{64\nu\rho}{\rho u D}\right)L = 32\nu\rho u \cdot \frac{L}{D^2}$$

wherein $\Delta p$ is the pressure drop through a cylindrical tube of length L and bore diameter D, $u$ is the linear average axial velocity of flow, $\rho$ is the density of the fluid, and $\mu$ is the kinematic viscosity, it will be evident that the pressure drop for a given fluid and given physical dimensions of the tube is directly proportional to the linear average axial velocity of flow. This in turn is proportional to the flow rate. It is possible therefore to define a fluid resistance $r$ as the ratio of a pressure drop across a resistance to the flow rate therethrough, the fluid resistance having a fixed value for a given fluid and its physical dimensions. Similarly the same definition of a resistance may be applied to any flow path other than a smooth tube involving suitably low Reynold's numbers, i. e., the law:

(2) $$p = ri$$

will hold for any restriction to flow (whether constituted by an elongated straight or spiral tube or capillary, a needle valve, porous material or the like) within limits suitable to the physical form of the resistance and the viscosity of the fluid. Furthermore, the departures from such linear proportionality between $p$ and $i$ are not great for higher Reynold's numbers of interest, so that the explanation of the invention will be based, for simplicity, upon an assumption of the general validity of (2) with the understanding that where actual departure occurs, suitable corrections of results, arrived at by calibration of the apparatus, may be necessary.

Let $i_2$ be a fluid flow circulated in the system as indicated by a pump P subject to certain controls, as pointed out hereafter, by a control device C responsive to pressures $p_1$, $p_2$ and $p_3$ at the points indicated. Assume, for the present, that the control device is such that (3) $\qquad i_2 = i_{20} + K(f_1 - f_3)$ in which $i_{20}$ and $K$ are constants and $f_1$ and $f_3$ are given by:

(4) $\qquad f_1 = (p_1 - p_2)(\mu - 1)a$ (5) $\qquad f_3 = (p_3 - p_2)\mu a$ wherein $\mu$ and $a$ are constants.

At equilibrium:

(6) $\qquad p_1 - p_2 = r_1 i_1$ (7) $\qquad p_3 - p_2 = r_2(i_2 - i_1)$

Accordingly:

(8) $\qquad f_1 = a(\mu - 1)r_1 i_1$ (9) $\qquad f_3 = a\mu(r_2 i_2 - r_2 i_1)$ so that:

(10) $\qquad i_2 = i_{20} + Ka\{(\mu - 1)r_1 i_1 - \mu r_2 i_2 + \mu r_2 i_1\}$

(11) $\qquad i_2(1 + Ka\mu r_2) = \{Ka\mu(r_1 + r_2) - Kar_1\}i_1 + i_{20}$

Assume, now, that $Ka\mu$ is sufficiently large that the unit term on the left is negligible. Then:

(12) $\qquad i_2 = \left(\frac{r_1 + r_2}{r_2} - \frac{r_1}{\mu r_2}\right)i_1 + \frac{i_{20}}{Ka\mu r_2}$ If it is further assumed possible to make $i_{20}$ small (or actually zero):

(13) $\qquad i_2 = i_1\left(\frac{r_1 + r_2}{r_2} - \frac{r_1}{\mu r_2}\right)$

For simplicity, and since the assumptions are well justified as explained later, Equation 13 will be taken as fundamental. Even if the assumptions are not met, the only practical result is a matter of calibration, the fundamental aspects of the operation being unchanged.

Substituting (13) in (7) and subtracting (7) from (6):

(14) $\qquad p_1 - p_3 = \frac{r_1}{\mu}i_1$

Since $p_1 - p_3$ is the pressure drop across the system and $i_1$ is the flow through it between its external connections, the input resistance R is:

(15) $\qquad R = \frac{r_1}{\mu}$

Despite a possibly very large resistance $r_1$, therefore, if $\mu$ is large, the input resistance offered by the system if placed in a flow line may be kept quite low.

From (6) and (14):

(16) $\qquad \frac{p_1 - p_2}{p_1 - p_3} = \mu$

Furthermore, from (6) and (14)

(17) $\qquad \frac{p_1 - p_2}{p_1 - p_3} = \mu - 1$

If, therefore, $\mu$ is large, the pressure drops $p_1 - p_2$ and $p_3 - p_2$ may be very much greater than a possibly small input pressure drop $p_1 - p_3$. The former are used for control so that the advantage of this is obvious.

Summarizing, and assuming that a measurement of a large $i_2$ is to be made to secure a measure of a small $i_1$, it will be evident from (13) that $r_1$ is to be taken as large as practical compared with $r_2$. Having done this, $\mu$ may be chosen as large as possible to give a low input resistance, in view of (15), consistent with keeping $p_1 - p_2$ and $p_3 - p_2$ within bounds in the light of (16) and (17).

By reasoning similar to the above, it may be shown that to a close approximation:

(18) $\qquad i_2{}^n = i_1{}^n\left(\frac{r_1 + r_2}{r_2} - \frac{r_1}{\mu r_2}\right)$ if the law of flow through the resistance is

(19) $\qquad p = ri^n,$ in which $n$ differs from unity. (For example if $n = 2$ as in the case of turbulent flow.) In fact even if the values of $n$ were different for $r_1$ and $r_2$, the apparatus would be readily calibrated to obtain the relation between $i_1$ and a greatly magnified corresponding $i_2$.

Figure 2:
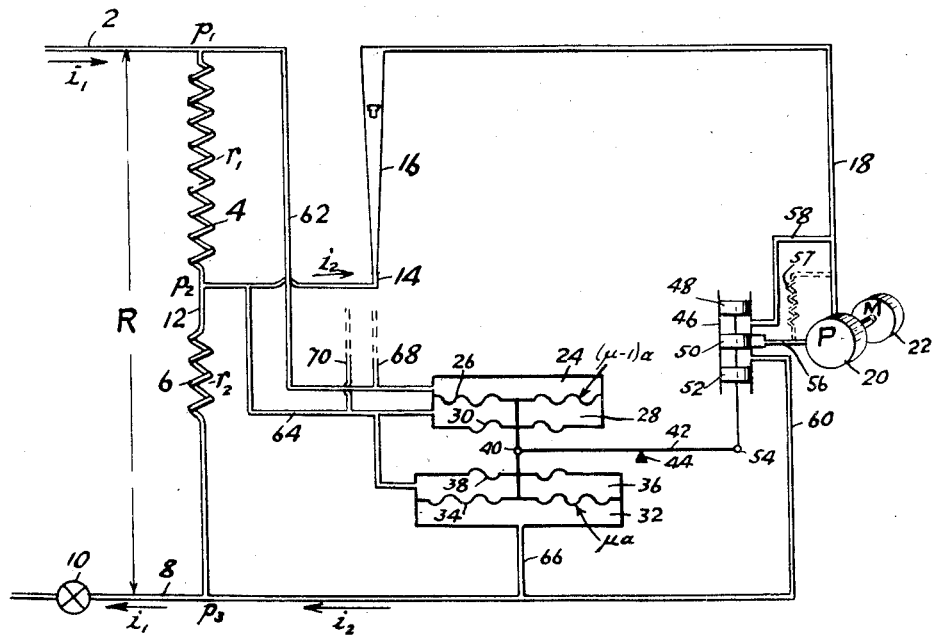
Figure 2 is a diagram illustrating a complete form of flow measurement apparatus provided in accordance with the invention.

The consistent attainment of these ends will become apparent from a consideration of Figure 2.

The inflow line to the apparatus indicated at 2 feeds a high resistance 4 and a low resistance 6 arranged in series, the latter being connected to the outflow line 8 in which is indicated a valve 10 which may, of course, represent any controlling element or construction having an effect in varying the flow. Such valve or other controlling element may be in the line 2, or the flow may be controlled by the existence of some particular variable pressure condition across the connections 2 and 8.

The resistances 4 and 6 may take any of the forms conventional in the art. For example, they may consist of coils, tubes or capillaries of fixed construction, needle or other flow controlling valves which may be set to provide definite resistance values, porous elements, or the like. Desirably the two resistances 4 and 6 are closely associated with each other so as to remain at about the same temperature with the net result that the resistance values presented by them will bear a substantially constant relationship except as intentionally changed. Either or both may, of course, be made variable.

To the junction 12 of the resistances 4 and 6 there is connected a line 14 communicating with a flow meter, which in the case illustrated is a rotameter 16. As will be evident, any other flow metering device may be provided, or if pressure control is to be effected, the meter may be omitted entirely. The line 14 feeds, either directly or through such meter, the intake line 18 leading to a suitable pump which may be of centrifugal or positive variety, in the latter case, for example, being a gear or screw pump. This pump is driven by a motor 22.

For control of the recirculating flow there is provided a relay. This relay comprises a chamber 24 closed by a diaphragm 26, a second chamber 28 on the opposite side of the diaphragm 26 and closed by a small diaphragm 30, a third chamber 32 closed by a diaphragm 34 and a fourth chamber 36 on the upper side of the diaphragm 34 closed by a small diaphragm 38. All of these diaphragms are preferably of the so-called slack variety so as to offer negligible stiffness against the action of controlling pressures. The diaphragms 30 and 38 are of equal area. The diaphragms 34 and 26, on the other hand, are unequal and their areas as indicated are in the ratio $$\frac{\mu}{\mu-1}$$

All four of the diaphragms are connected together and at 40 to a lever 42, fulcrumed at 44, which, in turn, is connected to a pilot valve at 54, which pilot valve comprises three pistons, 48, 50, and 52, sliding in a cylinder 46. The central piston 50 is arranged to control the outlet connection 56 from the pump 20. In the event that the pump is of positive type a by-pass such as indicated at 57 may be provided between the output and input of the pump containing either a suitable resistance or a relief valve to prevent damage in the event that the outflow connection 56 is temporarily entirely cut off by the piston 50. The space between the pistons 48 and 50 may be connected at 58 to the inflow line 18. Alternatively, the arrangement may be such that when the piston 50 moves downwardly it does not uncover the line 56 at all so that the pump must deliver through a by-pass. In the case of a centrifugal pump, of course, no by-pass is necessary unless the pump is of such size that it should be provided to prevent overheating.

The chamber between the pistons 50 and 52 is connected by a line 60 to the output line 8, i. e., the lower end of the resistance 6.

A line 62 joins the chamber 24 to the input side of the resistance 4. Connections 64 join the chambers 28 and 36 to the junction 12 of the resistances. A connection 66 joins the chamber 32 to the lower side of the resistance 6. If it is desired to take off pressure from the apparatus for controlling purposes, external pressure delivering connections may be provided as indicated at 68 and 70. Alternatively, such pressure connections may be taken off across the resistance 6.

It will be evident from comparison of Figure 2 with the foregoing theoretical discussion that the requirements set forth therein are met by the arrangement described. Opposed forces $f_1$ and $f_3$ are applied to the lever 42 through the diaphragms 26 and 34 in view of the relation of their areas as specified above. By making the chambers of minimum size very slight displacements of the diaphragms will be necessary to shift the pilot valve to give rise to a change of flow through the line 60 corresponding to a large value of K. The arrangement, furthermore, can be very slightly overbalanced so that for a value of $f_1-f_3=0$ the flow through the line 60 may be entirely cut off. In this fashion $i_{20}$ can be made zero so that Equation 13 will hold precisely.

As the areas of the diaphragms 26 and 34 are made more nearly the same, the value of $\mu$ can be made as large as desired. It will be evident that when equilibrium is obtained the conditions described in the theoretical discussion will exist so that to the extent that the pressure drops across the resistances 4 and 6 are proportional to the flows therethrough the flow through the line 14, 18 will bear a definite fixed ratio to the flow into and out of the apparatus at 2 and 8. As indicated above, by designing the resistance 4 suitably high with respect to the resistance 6 a very large ratio of the two flows may be attained so that a meter such as 16 in the line 14, 18 may be calibrated directly in terms of the input flow. Despite the fact that the resistance at 4 may have a very large value, the input resistance of the system may be kept quite low by a suitable high value of $\mu$.

The pressure drops across the resistances 4 and 6 may be greatly in excess of the input pressure drop and consequently are available for external control purposes.

While these pressure drops will, in general, be ample for actuating a relay such as disclosed, it will, of course, be clear that they may be suitably amplified in known fashion to overcome any resistance to motion offered by a pilot valve and its connections. It will also be clear that conventional stabilizing devices may be added if necessary when high rapidity of response is to be secured and fluid damping of the system is inadequate. Usually, however, elaboration in these respects will be unnecessary particularly when the fluid handled is a liquid rather than a gas.

Figure 3:
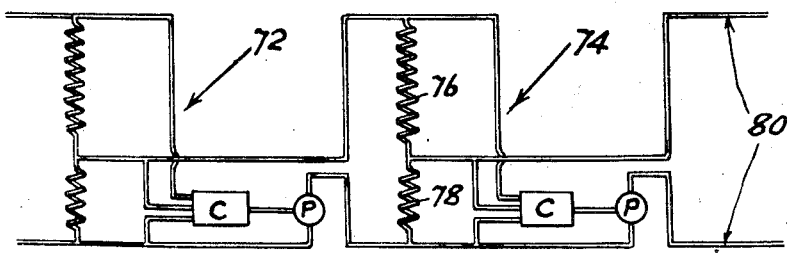
Figure 3 is a diagram showing the fashion in which staging may be accomplished for the measurement of very low flow rates or for the effecting of control thereby.

In order to secure very high magnifications of the flow for measuring or control purposes, there may be utilized a staging arrangement as indicated in Figure 3 in which, as will be evident, 72 and 74 represent duplications of what is detailed in Figures 1 and 2. The circulatory flow of the first stage is fed through the series input resistances of the second stage 76 and 78. The circulatory flow in the second stage may be delivered at 80 to still another stage or to a suitable flow meter. Pressure drops, of course, may be taken off the last stage resistances if high pressures are desired for control purposes.

Whereas in the foregoing a device C (Figure 1) is used to control the recirculatory flow $i_2$, and the result is to produce a flow $i_2$ which is in magnified ratio to a flow $i_1$, the principles set forth above are directly applicable to a similar system in which a control device controls the flow $i_1$. In such case $i_2$ may be made subject to arbitrary variation and the flow $i_1$ will then result in direct proportion to the flow $i_2$. The resulting apparatus will constitute an accurate control for a low rate of flow, an end usually difficult to achieve inasmuch as a low leakage through a small displacement pump will become a major proportion of the total desired flow. In accordance with the invention the error in a low rate of flow is kept down to the proportion of leakage or slip in a pump operating at a high displacement rate.

Figure 4:
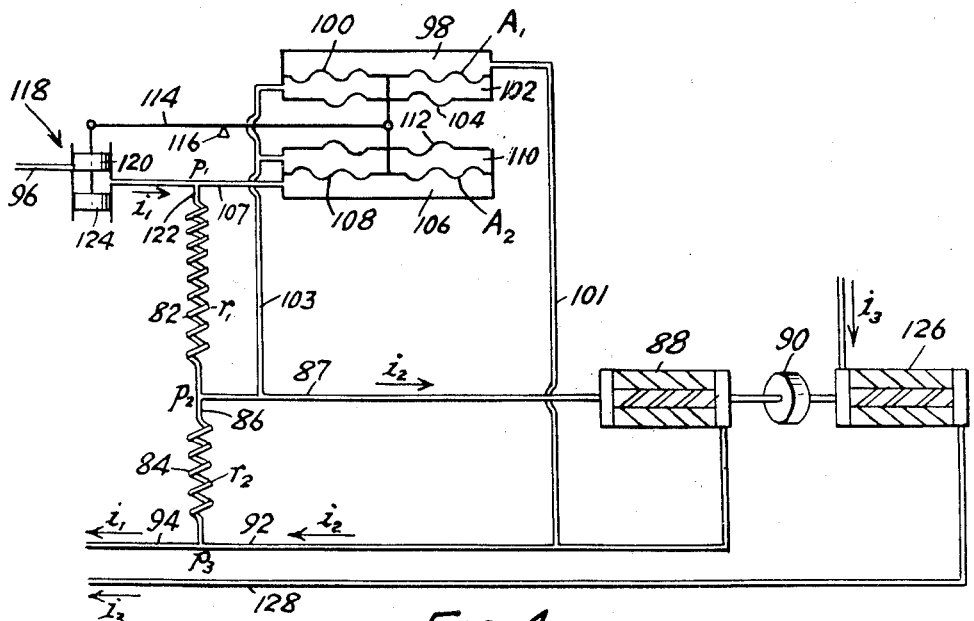
Figure 4 is a diagram illustrating the application of the invention to the accurate control of a low flow rate.

Apparatus for achieving the last mentioned result is illustrated in Figure 4. The series resistances 82 and 84 have their junction 86 connected to a line 87 leading to a positive pump 88 which is diagrammed as of the screw type. This pump may be of any positive type desirably such, however, as will provide a continuous uninterrupted and non-fluctuating flow. The so-called Imo pump is of this type. The pump 88 is driven by a motor 90 which may be of constant speed or accurately variable speed type so as to secure a predetermined displacement rate of the pump 88. The discharge line 92 from the pump completes the recirculatory system through the resistance 84. Discharge is effected through the line 94.

In this arrangement the inflow from the line 96 is controlled by a relay and valve arrangement comprising a chamber 98 closed by a slack diaphragm 100 on the opposite side of which is a chamber 102 closed by a small slack diaphragm 104. A second chamber 106 is closed by a slack diaphragm 108 on the opposite side of which is a chamber 110 closed by a slack diaphragm 112 having the same area as the diaphragm 104. The four diaphragms just described are connected together and to a lever 114 fulcrumed at 116. The lever 114 controls connected pistons 120 and 124 of a pilot valve 118. The piston 120 is arranged so that a slight upward movement thereof will open the inlet line 96 to the space between the pistons which is connected by a line 122 to the resistance 82. A line 101 joins the chamber 98 to the line 92. A line 103 joins the chambers 102 and 110 to the junction 86. A line 107 joins the connection 122 to the chamber 106.

Assuming pressures, resistances and flows as indicated in Figure 4, and that the areas of diaphragms 100 and 108 are, respectively, $A_1$ and $A_2$, a balanced condition exists when

(20) $$\frac{p_3-p_2}{p_1-p_2}=\frac{A_2}{A_1}=M$$

a constant.

Using (6) and (7), which hold for this modification in view of the choice of consistent notation,

(21) $$i_1=\frac{r_2}{Mr_1+r_2}i_2$$

Evaluating $p_1-p_3$,

(22) $$p_1-p_3=(1-M)r_1i_1$$

It may be noted that $M$ may be greater or less than unity. If $M$ is greater than unity, $p_1$ will be less than $p_3$, so that the system acts as a pump and the supply pressure to line 96 may be less than $p_3$, so long as it exceeds $p_1$ under all conditions of operation. If $M$ is less than unity, $p_1$ will always exceed $p_3$. From (22) it is evident that the input resistance R is given by:

(23) $$R=(1-M)r_1$$

and may be negative if $M>1$.

That the system of Figure 4 maintains the conditions required will be obvious. If the rate of flow $i_2$ is increased by speeding up the motor, $p_2$ will decrease relative to $p_3$ (assuming $p_3$ remains constant due to constant discharge pressure conditions). Therefore the valve opens to permit an increased flow $i_1$ which will increase the pressure drop $p_1-p_2$ to restore equilibrium. As in the previously described application of the invention, the relay and valve should be so constructed that a negligible flow of fluid into and out of the relay will cause a large change in flow through the valve.

It will be evident that there apply to Figure 4 the remarks made above with respect to departures from the law (2); i. e., a law such as (19) merely involves calibration of the system.

If it is desired to proportion a small quantity of fluid at a low rate of flow to a large quantity at a relatively high rate the motor 90 may simultaneously drive a second pump 126 to deliver through a line 128 a flow to which the discharge through the line 94 will bear a definite relationship. The flow rates $i_1$ and $i_3$ will then bear a definite ratio to a high degree of accuracy.

Figure 5:
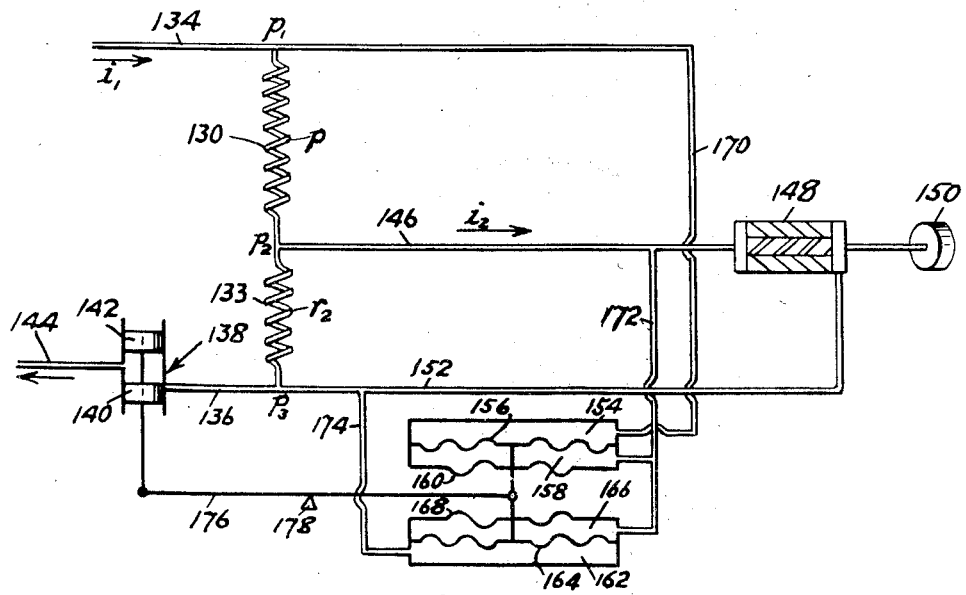
Figure 5 is a diagram of similar type but showing an alternative embodiment of the invention.

The control of the low rate flow may be achieved on the discharge side instead of on the inlet side of the apparatus by the use of the arrangement of Figure 5. In this case the two resistances 130 and 133 are provided as before. Inflow of the fluid takes place at 134 and discharge at 136, the discharge being controlled by a pilot valve 138. The discharge line 136 is controlled by the piston 140 which is associated with a piston 142 to provide an intermediate chamber connected to the discharge line 144. The circulatory system comprises the line 146, the pump 148 driven by the motor 150 and the line 152. A chamber 154 closed by a slack diaphragm 156 is connected by the line 170 to the inflow end of the resistance 130. Below the diaphragm 156 is a chamber 158 closed by a slack diaphragm 160. A chamber 162 is closed by a slack diaphragm 164 on the other side of which there is provided the chamber 166 closed by a slack diaphragm 168 having the same area as the diaphragm 160. The chambers 158 and 166 are connected to the line 146 at 172. The chamber 162 is connected to the line 152 at 174. The various diaphragms are connected to each other and to a lever 176, fulcrumed at 178, which, in turn, is connected to the pistons of the pilot valve.

It will be evident that the same considerations apply to Figure 5 as to Figure 4 and further discussion of the operation will, therefore, be unnecessary.

The proportioning of two small flows may be carried out by a combination of the metering arrangement of Figure 2 and the proportional pumping arrangement of either Figure 4 or Figure 5. Figure 6 illustrates how this may be done. At 180 there is indicated a measuring system which will be recognized as of the type of Figure 2. At 182 is a proportional pumping arrangement of the type illustrated in Figure 4. In the recirculatory system of 180 there is provided a meter 184 in the form of a positive screw pump, for example of Imo type, functioning as a meter by reason of its being driven by the recirculating flow. This meter drives through a gear box 186, which may be provided with suitable change gearing to secure any desirable ratio of drive, a pump 188 of positive type, such as the Imo type. By reason of this arrangement the displacements of the meter 184 and the pump 188 are maintained at a predetermined ratio. Fluid enters the system 180 at 190, flowing through the series resistances 192 and 194 to be discharged through the line 196 controlled, for example, by a valve 198. The recirculatory system comprises the line 200 in which is located the meter 184, a pump 202 driven by a motor 203 and a control valve 204 subject to the action of the relay indicated at 206 which is of the type previously described in connection with Figure 2. In the system 182 there are provided the series resistances 208 and 210 and the recirculatory system comprising the line 212 and the pump 188. A relay system 214 of the type described in connection with Figure 4 controls the inflow of fluid through the line 216. Discharge takes place through the line 218.

It will be evident from the foregoing discussions that small flows $i_1$, and $i_1'$ are accurately proportioned, the quantity $i_1'$ depending upon the quantity $i_1$. This result is accomplished without the interposition of a large input resistance in the line of flow of $i_1$ and, of course, with all of the other advantages described heretofore in both parts of the system.

It will be evident that the principles discussed above may be embodied in other fashions than those disclosed and consequently the invention is not to be understood as limited except to the extent required by the following claims.

What I claim and desire to protect by Letters Patent is:

1. In combination, means providing a pair of fluid resistances in series between inflow and outflow lines, pumping means producing fluid recirculation through one of said resistances, and means responsive to pressure drop across at least one of said resistances for controlling flow through at least one of said resistances.

2. In combination, means providing a pair of fluid resistances in series between inflow and outflow lines, pumping means producing fluid recirculation through one of said resistances, and means responsive to the pressure drops across both of said resistances for controlling flow through at least one of said resistances.

3. In combination, means providing a pair of fluid resistances in series between inflow and outflow lines, pumping means producing fluid recirculation through one of said resistances, and means responsive to pressure drop across at least one of said resistances for controlling said fluid recirculation.

4. In combination, means providing a pair of fluid resistances in series between inflow and outflow lines, pumping means producing fluid recirculation through one of said resistances, and means responsive to the pressure drops across both of said resistances for controlling said fluid recirculation.

5. In combination, means providing a pair of fluid resistances in series between inflow and outflow lines, pumping means producing fluid recirculation through one of said resistances, and means responsive to pressure drop across at least one of said resistances for controlling flow through one of said lines.

6. In combination, means providing a pair of fluid resistances in series between inflow and outflow lines, pumping means producing fluid recirculation through one of said resistances, and means responsive to the pressure drops across both of said resistances for controlling flow through one of said lines.

7. In combination, means providing a pair of fluid resistances in series between inflow and outflow lines, pumping means producing fluid recirculation through one of said resistances, a meter in the path of said recirculation, and means responsive to pressure drop across at least one of said resistances for controlling flow through at least one of said resistances.

8. In combination, means providing a pair of fluid resistances in series between inflow and outflow lines, pumping means producing fluid recirculation through one of said resistances, a meter in the path of said recirculation, and means responsive to the pressure drops across both of said resistances for controlling flow through at least one of said resistances.

9. In combination, means providing a pair of fluid resistances in series between inflow and outflow lines, pumping means producing fluid recirculation through one of said resistances, and means responsive to a difference in the pressure drops across said resistances for controlling flow through at least one of said resistances.

10. In combination, means providing a pair of fluid resistances in series between inflow and outflow lines, pumping means producing fluid recirculation through one of said resistances, and means responsive to a difference in the pressure drops across said resistances for controlling said fluid recirculation.

11. In combination, means providing a pair of fluid resistances in series between inflow and outflow lines, pumping means producing fluid recirculation through one of said resistances, and means responsive to a difference in the pressure drops across said resistances for controlling flow through one of said lines.

12. In combination, means providing a pair of fluid resistances in series between inflow and outflow lines, pumping means producing fluid recirculation through one of said resistances, a meter in the path of said recirculation, and means responsive to pressure drop across at least one of said resistances for controlling said fluid recirculation.

13. In combination, means providing a pair of fluid resistances in series between inflow and outflow lines, pumping means producing fluid recirculation through one of said resistances, a meter in the path of said recirculation, and means responsive to the pressure drops across both of said resistances for controlling said fluid recirculation.

GEORGE A. SMITH.

REFERENCES CITED

The following references are of record in the file of this patent:

UNITED STATES PATENTS

| Number | Name | Date |
| --- | --- | --- |
| 790,888 | Ferris | May 30, 1905 |
| 1,307,337 | Bassett | June 24, 1919 |